United States Patent [19]

Honda et al.

[11] 3,904,377
[45] Sept. 9, 1975

[54] LIGHTWEIGHT COMPOSITE CONTAINING HOLLOW GLASS MICROSPHERES

[75] Inventors: Hidemasa Honda; Yukio Isayama; Kazuhiko Jinnai; Kunio Kimura, all of Tosu, Japan

[73] Assignee: Agency of Industrial Science & Technology, Tokyo, Japan

[22] Filed: July 23, 1973

[21] Appl. No.: 381,778

Related U.S. Application Data

[63] Continuation-in-part of Ser. No. 120,253, March 2, 1971, Pat. No. 3,752,685.

[30] Foreign Application Priority Data

Mar. 6, 1970    Japan................................ 45-18722

[52] U.S. Cl................................ 29/180 R; 29/183
[51] Int. Cl.² ........................................ B22D 19/00
[58] Field of Search.............. 29/180 R, 191.2, 183; 75/20 R, 20 F; 106/288 B, 308 B; 161/DIG. 5; 164/97, 98, 108, 230, 350

[56] References Cited
UNITED STATES PATENTS

| | | |
|---|---|---|
| 2,953,849 | 9/1960 | Morgan...................... 29/195 G UX |
| 2,978,340 | 4/1961 | Veatch et al. .................. 161/DIG. 5 |
| 3,047,409 | 7/1962 | Slayter et al.................. 29/195 G X |
| 3,049,799 | 8/1962 | Breining et al. .................. 29/191.2 |
| 3,086,898 | 4/1963 | Alford et al. .................. 161/DIG. 5 |

Primary Examiner—L. Dewayne Rutledge
Assistant Examiner—O. F. Crutchfield
Attorney, Agent, or Firm—Kurt Kelman

[57] ABSTRACT

When finely divided SHIRASU (pumice ejected from volcanoes and the secondary deposit of such pumice) is roasted at a temperature in the range of from about 800° to about 1200°C, the vitreous particles contained in said SHIRASU foam and consequently produce light-weight hollow glass microspheres. The hollow glass microspheres so produced are superior to conventional glass microspheres especially in their resistance to heat and can therefore be combined with metal, carbon, as well as with cement and other materials to produce novel lightweight composites.

3 Claims, 5 Drawing Figures

LIGHTWEIGHT COMPOSITE CONTAINING HOLLOW GLASS MICROSPHERES

REFERENCE TO COPENDING APPLICATION

This is a continuation-in-part of our copending application Ser. No. 120,253, filed Mar. 2, 1971, now U.S. Pat. No. 3,752,685.

BACKGROUND OF THE INVENTION

This invention relates to a lightweight composite containing hollow glass microspheres and to a method for the manufacture thereof. More particularly, this invention relates to a lightweight carbon and hollow glass sphere composite or a lightweight metal and hollow glass sphere composite having hollow glass microspheres dispersed and incorporated in carbon or metal and to a method for the manufacture thereof.

Hollow glass microspheres are light in weight, resist chemicals, obstruct thermal conduction and impede liquid absorption. Because of these excellent properties, they are extensively used as an extender for plastics, as an aggregate for weight reduction in construction materials, as a heat insulating material, etc.

Heretofore, hollow glass microspheres have been manufactured by combining sodium silicate and borax with a suitable foaming agent, drying the resulting mixture, crushing the mixture, adjusting the crushed particles in size and subsequently roasting the particles (U.S. Pat. No. 2,978,340, for example). Composites have been produced by mixing hollow glass microspheres thus obtained into organic and inorganic materials such as synthetic resin, asphalt, cement and shaping the resulting mixtures into desired forms. When a composite is manufactured by using a synthetic resin as a matrix, for example, the composite is easy to produce and has many advantageous points to offer, such as high electric insulating property and excellent processability. This composite, however, is not fully satisfactory in that the highest attainable heat resistance is only about 200°C and the chemical resistance is variable with the kind of synthetic resin to be used. It also has a disadvantage that it is heavily degraded in consequence of aging and frequently generates large volumes of noxious gas during combustion. When cement or some other similar inorganic material is used as a matrix, the resultant composite enjoys outstanding resistance against fire as compared with composites using organic matrixes. Because of the critical drawback that conventional hollow glass microspheres melt at about 300°C, however, said composite is susceptible to conspicuous degradation by heat. This composite is further defective in that it has poor processability and provides much lower resistance to chemicals than composites using organic matrixes.

By contrast, a carbon or graphite composite produced by using coke as an aggregate and a pitch such as petroleum pitch or coal tar pitch as a binder or a carbon or graphite composite produced by using a phenol resin, furan resin, furfural resin, furfural acetone resin or polyacrylonitrile resin as the starting material excels in resistance to heat, chemicals and heat impact and yet suffers from disadvantages such as complexity of manufacturing process, requirement of much time for the roasting treatment, heavy dimensional change during roasting, inferior product processability, etc.

A composite of glass fiber and carbon which is intended to eliminate the drawbacks and make full use of the advantages of such carbon composite has been developed. This composite excels in resistance to heat, heat impact and chemicals and further enjoys high dimensional stability during the process of manufacture. Nevertheless, it still involves drawbacks such as inferior processability and undesirably high specific gravity.

As a lightweight carbon product, there exists a foamed carbon material which is obtained by foaming a thermosetting resin such as phenol resin and roasting the foamed resin. This carbon composite has a small bulk density of about 0.3 g/cm$^2$ and enjoys high compressive strength and shear strength. It, however, entails a highly complicated manufacturing process consisting of the stages of foaming and roasting.

A number of porous metal materials have also been developed to provide lightweight metal products. For example, a foamed aluminum material is obtained by keeping molten aluminum agitated and casting magnesium and titanium into the molten aluminum while it is in a highly viscous state during cooling. This method is barely capable of producing a foamed metal of specific components and involves a complicated process. There is another known method by which a foamed metal material is produced by adding a foaming aid such as, for example, a hydration product of the mother metal. In one version of this method, a powdered alloy containing a foaming aid is directly added to the surface of a molten metal. In this case, the added powder tends to float on the surface of the melt, making it extremely difficult to foam the molten metal uniformly. Another version of this method comprises the steps of mixing a granulated metal with a foaming aid or with a granulated metal incorporating a foaming aid and fusing the resultant mixture under heat, with the result that the foaming aid is decomposed and the gas emanating from the decomposed foaming aid helps make the metal porous. With this method, it is relatively easy to uniformly disperse the foaming aid in the metal. However, the metal must be used in granulated foam and, therefore, when it is fused under heat in the open air, the individual granules of the metal are oxidized on the surface and cannot be sufficiently bonded with one another particularly when the metal happens to be a readily oxidizable metal such as aluminum, zinc, magnesium, etc. Preclusion of this difficulty calls for a troublesome operation such as inactivation of the atmosphere.

In the manufacture of a porous metal by means of a foaming agent or foaming aid, the gas resulting from the decomposition of the foaming agent or foaming aid disperses within the molten metal and renders the metal porous. Therefore, the kinds of porous metals which can be manufactured by this method are limited by the temperature at which the foaming agent or foaming aid in use is decomposed. To obtain uniform distribution of pores within the metal, the fusing temperature and the period of fusion must be rigidly regulated. The foam emanating from the decomposed foaming agent or foaming aid quite readily escapes retention by the metal texture. Even when a metal of which the solid phase temperature and the liquid phase temperature differ widely from each other is fused at a temperature approximating the said solid phase temperature so as to establish a system serving to impede ready floatation of the resulting foam, the foam finds its way out of the molten metal in a very short time. This escape of the foam must be precluded by keeping the entire system of molten metal under a high pressure, rapidly cooling the system or employing some other effective means. In any case, this effort entails an extremely complicated operation. Further, the shape of the individual pores which are distributed within the porous metal to be produced by using a foaming agent or foaming aid is variable with the kind of metal to be used. This variation is ascribable to the difference of solidifying properties among metals. The shape of the pores is liable to complexity especially in the case of an alloy. Consequently, the strength is seriously degraded. In the case of aluminum, for example, the porous aluminum material which is manufactured by using a foaming agent or foaming aid can have its strength lowered to less than one-hundredth of the original magnitude. Thus, porous metal materials manufactured by the method described above are usable only for specific applications.

A primary object of the present invention is to provide a composite which is light in weight and excellent in resistance to heat and chemicals and in mechanical strength and a method for the manufacture thereof.

SUMMARY OF THE INVENTION

Pumice ejected from volcanoes and the secondary deposit of such pumice occur widely in nature. When the pumice or the secondary deposit thereof is finely pulverized and then roasted at temperatures of 800°–1200°C, the vitreous component present in the pumice or the deposit thereof foams to form hollow pumiceous glass microspheres. The hollow spheres thus obtained have a melting point of about 1,300°C. When they are dispersed in a pitch or a resin and the resultant dispersion is roasted, there can readily be formed a lightweight carbon and hollow glass sphere composite. When they are dispersed in molten aluminum, zinc, magnesium, etc., they readily form a metal-hollow glass sphere composite without being melted by the heat of the molten metal. The lightweight composite produced in the manner mentioned above possesses all the advantageous properties of conventional composites and further enjoys improved properties such as higher resistance to heat and added ease of processing.

Other objects and other characteristic features of the present invention will become apparent from the further description to be given in further detail herein below with reference to the attached drawing.

DETAILED EXPLANATION OF THE INVENTION

The inventors have found that when SHIRASU abundantly occurring natural substances, are roasted for a short period of time at temperatures in the range of from about 800° to 1200°C, the vitreous particles contained in the said SHIRASU foam and consequently produce hollow glass microspheres.

The term "SHIRASU" as used in the present specification means massive, granular or powdery natural pumice ejected from volcanoes and the secondary deposit of such pumice.

For example, the SHIRASU produced in Kagoshima Prefecture of Japan is found to have the following mineral percentage composition.

Table 1

| Volcanic glass | 70.26% |
|---|---|
| Feldspar and quartz | 27.73% |
| Magnetite and others | 2.01% |

SHIRASU as a natural product occurs usually in a massive or granular form. It is pulverized by a suitable method to a particle size smaller than 250 $\mu$ and then roasted at a temperature in the range of from about 800° to 1200°C for a short time in a rotary kiln or the like. Consequently, the vitreous particles (volcanic glass) contained therein are softened by the heat and are foamed by the gas, moisture etc. contained therein, with the result that there are formed hollow glass microspheres about twice as large as the original particle.

For the purpose of roasting, the particle size of SHIRASU is desired to be smaller than 250 $\mu$. If the particle size exceeds 250 $\mu$, the microspheres foamed in the roasting treatment do not have a sufficient degree of strength and the vitreous particles which undergo foaming remain in contact with the impure ingredients, making it difficult to obtain microspheres of pure glass. If the particle size is smaller than about 49 $\mu$, however, the vitreous particles break and tend to resist foaming. Even if foaming occurs, microspheres formed are small and are readily melted and fail to give a satisfactory yield.

When the roasting temperature is below 800°C, the vitreous particles in SHIRASU are neither melted nor foamed. When it exceeds about 1200°C, microspheres which have been once formed again melt completely.

There is a close relationship between the roasting time and the roasting temperature just mentioned. At least about 10 minutes is required where the roasting is performed at temperatures around 800°C. Less than 1 minutes suffices where the roasting is carried out at higher temperatures approaching 1200°C.

Figure 1:
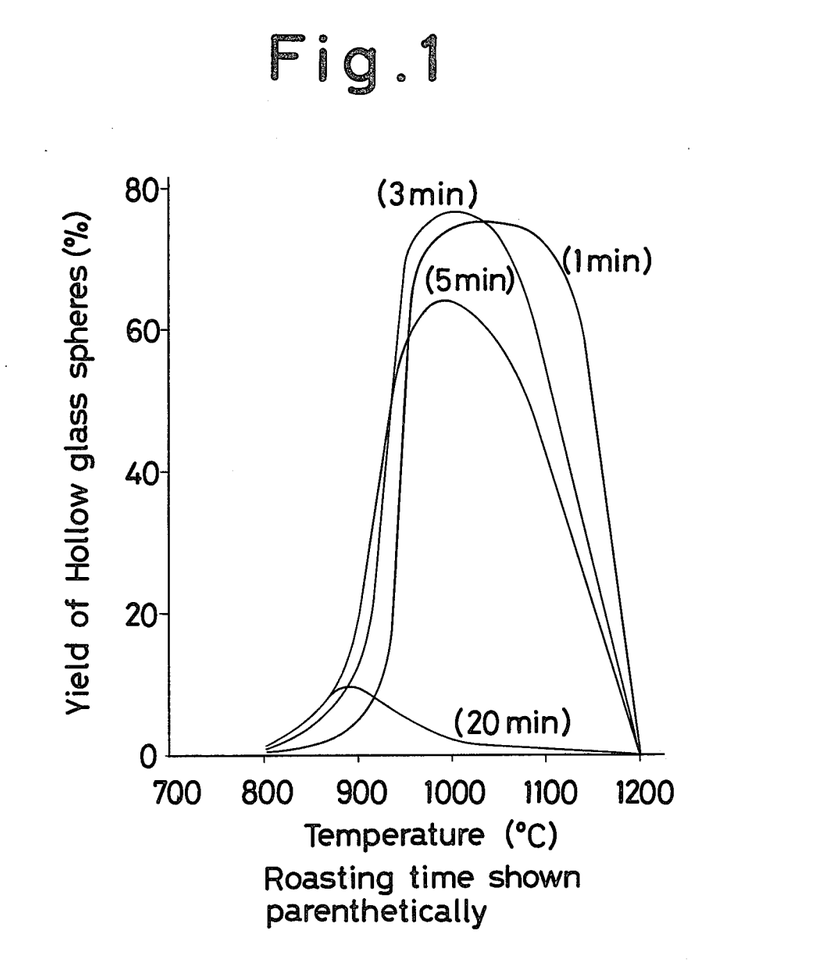
FIG. 1 is a graph showing the relation between the roasting temperature of SHIRASU and the yield of hollow glass spheres.
Figure 2:
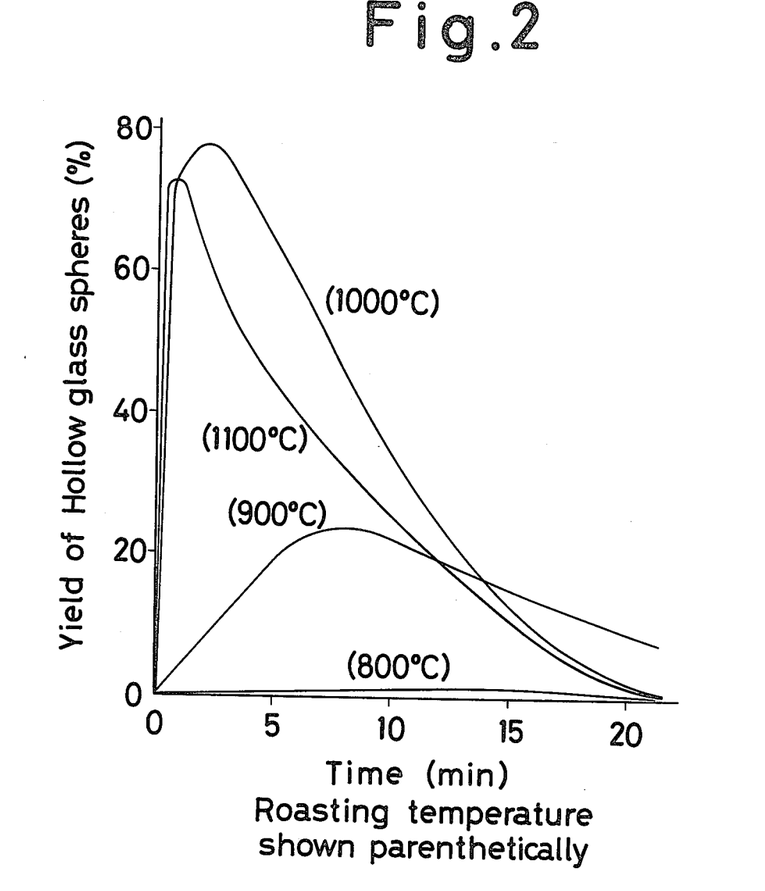
FIG. 2 is a graph showing the relation between the roasting time of SHIRASU and the yield of hollow glass spheres.

The relationship between the roasting temperature and the roasting time is shown in FIG. 1 and FIG. 2. SHIRASU used as the raw material in this case was found to have the particle size distribution shown in Table 2.

Table 2

| Particle size ($\mu$) | Percentage composition | | Vitreous particle content | |
|---|---|---|---|---|
| 149 – 105 | About | 22% | About | 65% |
| 105 – 74 | " | 18% | " | 75% |
| 74 – 44 | " | 20% | " | 80% |
| Below 44 | " | 40% | " | 90% |

FIG. 1 shows that, when the vitreous particles present in the preceding raw material are separated and roasted for 3 minutes at about 1000°C, about 75 percent of the vitreous particles are foamed to produce microspheres. When they are roasted for 1 minute at about 1050°C, about 75 percent of them are foamed to produce microspheres. When the roasting is done at about 900°C, however, only about 10 percent of the vitreous particles are foamed to produce microspheres even if the roasting time is as long as 20 minutes.

FIG. 2 indicates that, when the roasting is performed at about 1100°C for 1 minute, about 72 percent of the vitreous particles are converted into microspheres. When the roasting time is extended to 5 minutes at the same temperature, only about 42 percent of the vitreous particles are foamed. This decline in yield results because a proportion of the hollow glass microspheres formed at an early stage are melted down at a later stage in the course of heating.

If finely divided SHIRASU particles are roasted as mingled with heavy sand, quartz, feldspar, hypersthenite or other crystalline mineral, slime or similar impure ingredients in, for example, a rotary kiln, only the vitreous particles are selectively foamed to produce microspheres. From the standpoint of thermal efficiency, however, it is preferable to separate the vitreous particles from the finely divided SHIRASU particles and subject the separated particles alone to roasting.

One method available for the separation of vitreous particles makes use of the difference in specific gravity. Since the vitreous particles have specific gravities of about 2.4 or less and unfoamable crystalline mineral ingredients such as quartz, feldspar and hypersthenite have specific gravities of 2.6 or greater, the former particles can easily be separated by means of such gravitational separators as jig and table separators or cyclones.

The SHIRASU particles which have undergone the aforementioned roasting treatment are cooled and subsequently dropped into a pool of water. The microspheres alone float to the water surface and the unfoamed ingredients such as heavy sand, and slime settle to the bottom. As a consequence, nearly 100 percent pure hollow glass microspheres can be readily separated from the impure ingredients. It goes without saying that the separation can be accomplished not only by such classification in water but also by classification in the air.

The following table shows the physical properties of the microspheres thus obtained.

Table 3

| Particle size (diameter) | 74–149µ | 149–297µ | 297–600µ |
| --- | --- | --- | --- |
| Apparent specific gravity | 0.470 | 0.364 | 0.242 |
| Bulk density | 0.324 | | |
| Melting point | | 1200 – 1300°C | |
| Strength (Static water) pressure for 50% breakage) | | 80 –100 kg/cm² | |

As is clear from the table given above, the hollow glass microspheres according to this invention resist heat up to 1300°C, a temperature far higher than the maximum temperature endured by conventional hollow glass spheres. Therefore, they can produce a lightweight carbon and hollow glass sphere composite when they are mixed with a pitch or resin, molded to a desired shape and then roasted. When the hollow glass microspheres are dispersed in the molten mass of a metal having a lower melting point than the microspheres, such as copper, aluminum, zinc or tin, there can be obtained a lightweight metal and hollow glass sphere composite. When the hollow glass microspheres are added, as a lightweight aggregate, directly to cement, there is obtained a lightweight composite having a specific gravity of 0.6–0.65 and a compressive strength of 80–150 kg/cm².

Now, a description will be given of a lightweight carbon and hollow glass sphere composite herein below.

A carbon and hollow glass sphere composite is obtained by combining, at a stated weight ratio, hollow glass microspheres and a binder selected from the group consisting of coal tar, coal tar pitch, petroleum pitch, thermo-decomposition pitch, asphalt and other pitches, phenol resins, furan resins, acrylonitrile resins and other thermosetting resins, shaping the resultant mixture to a desired form and thereafter roasting the shaped mixture in an inert atmosphere. If occasion demands, said mixture may incorporate coal, coke, carbon stock, graphite stock or carbon black is a filler. When the binder to be used is in a powdery form, the mixture is subjected to shaping at a temperature exceeding the softening point of the binder under a pressure not strong enough to break the hollow glass spheres. When the binder is either a liquid or a suspension, the shaping of the mixture is desirably effected by extrusion molding, cast molding or the like. The shaped mixture is heated in an atmosphere devoid of oxygen at a rate of temperature increase suited to the kind and the percentage composition of the binder being used and roasted at a stated temperature below 1300°C. When a pitch is used as the binder, special precautions must be exercised in selecting the rate of temperature increase at which the mixture is heated to about 500°C. The shaped mixture may be deformed if the rate of temperature increase is not proper.

The mixing ratio of hollow glass spheres to the binder and the filler is such that the glass spheres will account for 20 to 80 percent of the apparent volume of the carbon and hollow glass composite to be produced. If hollow glass spheres are contained by more than 80 percent, the produced composite is deficient in mechanical strength. If they are contained by less than 20 percent, however, the composite fails to satisfy the purpose of weight reduction. The mixing ratio, therefore, is suitably fixed within the aforementioned range to suit the purpose for which the product is used.

The composite which is produced in accordance with the method mentioned above contains hollow glass spheres and, therefore, is light in weight compared with ordinary carbon products. In contrast to a carbon electrode which has a bulk density of about 1.5 g/cm³, the composite produced by the method of this invention generally has a bulk density of not more than 1 g/cm³, though variable to some extent with the kind of binder, the amount of binder and that of filler, the pressure applied at the time of shaping, etc. The small bulk density compared with that of any other ordinary carbon product constitutes one of the major features of the composite of this invention.

Further, the composite enjoys high dimensional stability because the shrinkage which the shaped mixture undergoes in the course of roasting is inconspicuous. When coal tar pitch is used as the binder, for example, the ratio of voluminal decrease due to shrinkage is not more than 8.5 percent as shown in Table 4. Generally, the shrinkage experienced by the composite is 10 percent at most. Such small shrinkage during the stage of roasting compared with that of an ordinary carbon product forms another characteristic feature of the present invention.

Table 4

| Mixing ratio of pitch (% by weight) | Dimensional change (%) | | Voluminal change (%) |
|---|---|---|---|
| | Longitudinal direction* | Lateral direction** | |
| 20 | −4.0 | −5.3 | −8.5 |
| 30 | −5.0 | −5.3 | −8.4 |
| 40 | −3.5 | −2.8 | −6.1 |

(Note)
* Direction of shaping
** Direction perpendicular to direction of molding The strength of the composite produced according to the present invention is variable to some extent with the particle size of the hollow glass spheres, the kinds of binder and filler, the amounts in which they are used, the method of shaping, the roasting conditions, etc.

Figure 3:
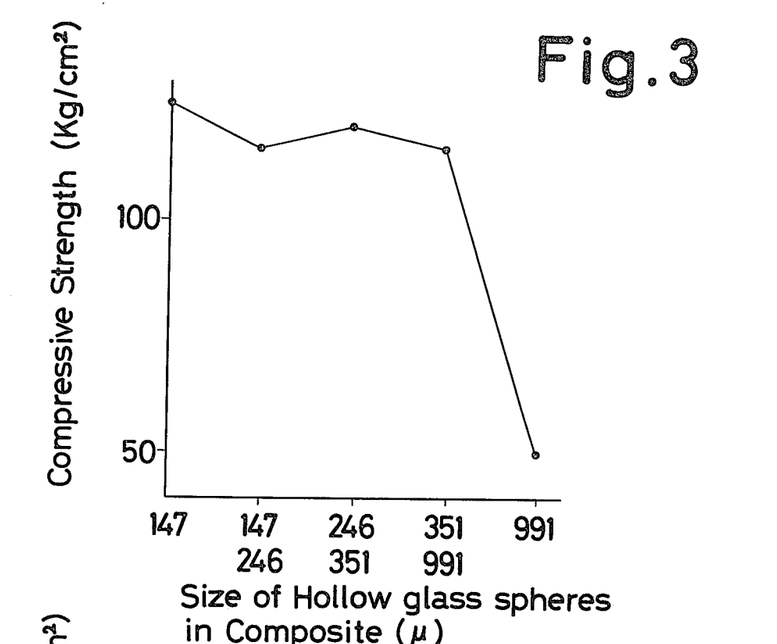
FIG. 3 is a graph showing the relation between the compressive strength of the carbon and hollow glass sphere composite according to the present invention and the particle size of the hollow glass spheres in the composite.

FIG. 3 is a graph showing the relation between the compressive strength of a carbon and hollow glass shpere composite containing 65 percent by volume of hollow glass spheres and the particle size of hollow glass spheres. In said composite, coal tar pitch was used as the binder and powdered coke having a particle size not exceeding 74 $\mu$ was used as the filler at a mixing ratio of 3 : 2.

It is clear from FIG. 3 that the composite shows a sharp decline in compressive strength when hollow spheres used therein have a particle size exceeding 991 $\mu$, while it shows substantially no change in compressive strength when the spheres have a particle size not exceeding 991 $\mu$.

Figure 4:
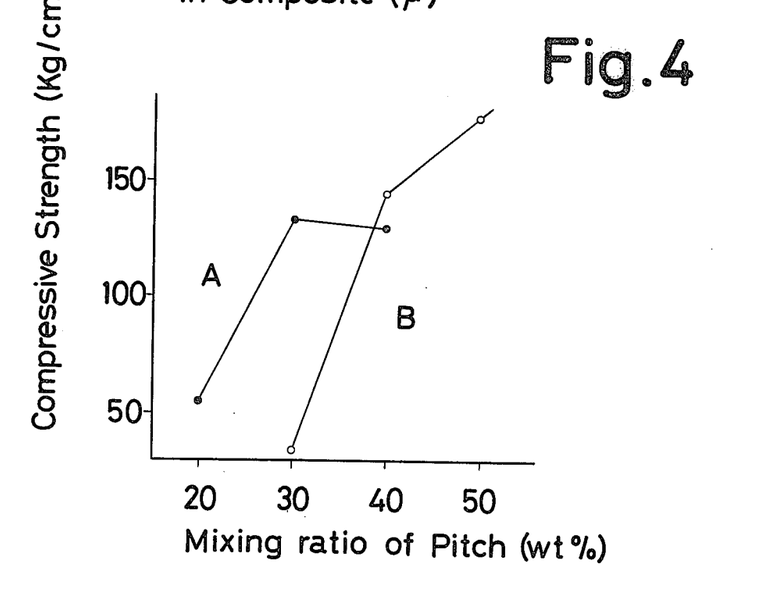
FIG. 4 is a graph showing the relation between the compressive strength of the carbon and hollow glass sphere composite according to the present invention and the kind and percentage composition of the binding agent used.

FIG. 4 is a graph showing the relation between the compressive strength of a carbon and hollow glass sphere composite and the kind of pitch used and the mixing ratio of the pitch. The hollow glass spheres used in this case had an average particle size of 200 $\mu$.

In the graph, the curve "A" represents the data obtained for a composite using coal tar having a softening point of 95°C and the curve "B" the data obtained for another composite using petroleum pitch having a softening point of 160°C respectively as the binder. The mixing ratio of the binder is expressed in percentage based on the weight of the composite. It is seen from the graph that the compressive strength of the composite increases with the increasing mixing ratio of the binder.

Figure 5:
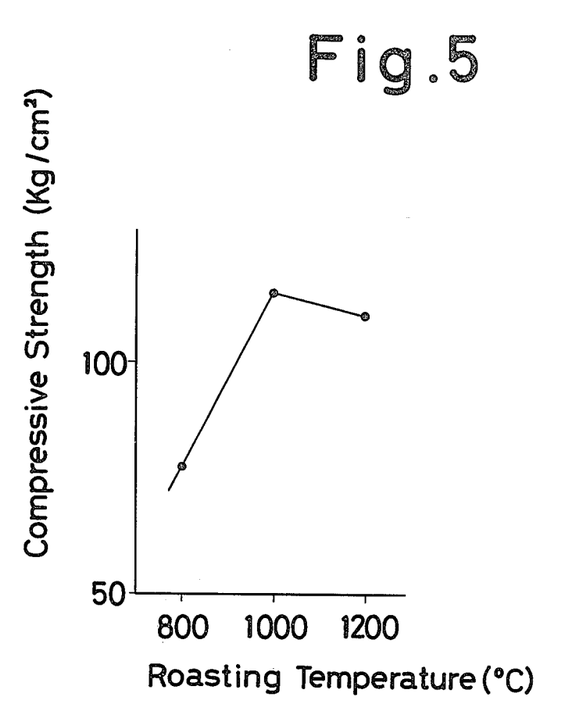
FIG. 5 is a graph showing the relation between the compressive strength of the carbon and hollow glass sphere composite according to the present invention and the roasting temperature.

FIG. 5 is a graph showing the relation between the compressive strength of a carbon and hollow glass sphere composite and the roasting temperature.

Shaped mixtures each prepared by combining 30 percent by weight of coal tar pitch and 20 percent by weight of powdered coke having a particle diameter not more than 74 $\mu$ with the balance to make up 100 percent by weight of hollow glass spheres having an average particle size of 200 $\mu$ were roasted at 800°C, 1000°C and 1200°C respectively. The composite obtained at the roasting temperature of 1000°C showed the highest compressive strength. When the roasting temperature exceeded 1200°C, softening of hollow glass spheres started on the surface of the composite and proceeded in the direction of the depth.

This phenomenon may be used to advantage. A composite having its surface covered fast with a vitreous layer can easily be produced by properly controlling the roasting temperature.

Although the heat resistance of this composite varies with the roasting temperature, the composite of this invention endures heat to a strikingly higher temperature than an ordinary glass fiber-reinforced resin or synthetic resin and hollow glass sphere composite of which the maximum temperature resistance is only 200°C. It also excels in resistance to heat impact. A composite obtained by roasting a mixture incorporating coal tar pitch as the binder at 1200°C, for example, is so resistant to heat shock that is not adversely affected in any way when it is heated again to 1000°C and immediately plunged into water.

This composite so excels in chemical resistance that it is scarcely acted upon by inorganic acids, alkalis and organic solvents. A composite produced by using coal tar pitch as the binder was kept submerged in various chemicals for 48 hours at normal room temperature and then tested for weight change. The results were as shown in Table 5 below.

Table 5

| Name of chemical | Loss of weight (%) | Name of chemical | Loss of weight (%) |
|---|---|---|---|
| 50% Sulfuric acid | −1.4 | 14% Ammonia water | −2.7 |
| 12.5% Hydrochloric acid | −2.4 | 50% Acetic acid | 0 |
| 50% Sodium Hydroxide | −5.4 | Benzene | 0 |
| 10% Sodium hydroxide | −2.4 | Acetone | 0 |

Further, the composite of this invention is easy to process. It can be freely processed to any desired shape by use of an ordinary tool. It permits impact insertion of nails and other similar fasteners. It can be bonded with an adhesive agent. Such outstanding processability enjoyed by the composite of this invention is a characteristic feature which has never been attained in conventional carbon products.

The electric resistance of the composite can be lowered by using a carbon stock or graphite stock as the filler in the manufacture of the composite. And the extent to which the electric resistance is lowered can freely be controlled by selecting the relative amount of the filler to be added. The composite with a lowered electric resistance can be used as a panel heater and as a shield against electric waves.

Since the composite according to the present invention enjoys many outstanding properties, it can be used as a raw material in the construction of chemical devices.

Now, an explanation will be given about a lightweight metal and hollow glass sphere composite.

Since the hollow glass spheres according to the present invention have a melting point of 1200° to 1300°C, they can easily produce a composite in conjunction with a metal which melts below such temperature.

The metal and hollow glass sphere composite is obtained by introducing a prescribed amount of hollow glass spheres into a molten metal or by pouring a molten metal into a mold which is charged in advance with hollow glass spheres. Otherwise, the composite is produced by placing a metal and hollow glass spheres in a mold and then heating the mold to a temperature higher than the melting point of the metal and not higher than that of glass spheres so that the metal is selectively melted. In this case, the hollow glass spheres are lighter than the metal and, as a natural consequence, they float to the surface of the molten metal. This phenomenon can be precluded by placing a metal gauze each at the inlet and the outlet of the mold after introduction of hollow glass spheres and thereafter pouring the molten metal into the mold, so that the metal gauzes prevent the hollow glass spheres from floating to the surface of the molten metal as its surface gradually rises.

The hollow glass spheres show extremely poor wettability to the molten metal and the molten metal itself shows a high degree of surface tension. The molten metal is cast under pressure into the mold or the mold interior is maintained under diminished pressure in order that the voids occurring between hollow glass spheres may be filled up completely with the molten metal. For example, when pure aluminum melted at 710°C was cast into a mold which was tightly filled with hollow glass spheres having a particle size of 297–590 $\mu$, a composite containing absolutely no voids and incorporating about 60 percent by volume of hollow glass spheres could be obtained by making the introduction of the molten aluminum under constant application of pressure of about 180 mmHg.

Suitable for the manufacture of the composite of this invention are low-melting metals such as aluminum, zinc, lead and tin. These metals may be used either independently or in the form of a mixture of two or more members.

The percentage to be accounted for by hollow glass spheres in the entire volume of the composite may be freely selected to suit the particular purpose for which the composite is intended. If it is too small, then hollow glass spheres float up and tend to resist being uniformly distributed within the composite. Moreover, the object of weight reduction is not accomplished. For the purpose of ensuring the advantages of lightweight and desirable mechanical strength, use of a composite containing 30 - 80 percent by volume of hollow glass spheres proves to be practical.

As is clear from the foregoing description, the hollow glass spheres to be used herein are obtained from a natural product as the raw material and, therefore, are quite inexpensive. The composite of the present invention, accordingly, is also inexpensive. The specific gravity of the composite to be produced can freely be selected. Because of its excellent resistance to chemicals, thermal conduction, liquid absorption and heat, the composition of this invention can be put to a broad spectrum of uses in building materials, aircraft materials, buoyant materials, chemical device elements, electric insulating materials, etc.

Preferred embodiments of the present invention will be cited herein below. It should be understood that they are illustrative of and not in the least limitative of the present invention.

EXAMPLE 1

In a rotary kiln, 500g of SHIRASU having a composition shown in Table 6 and comminuted to a particle size not more than 150 $\mu$ was calcined at 1000°C for two minutes. When the calcined pumice was thrown into water, about 350g of hollow glass spheres floated to the surface of the water and were recovered. The hollow glass spheres were found to have a particle size of about 200 $\mu$.

Table 6

| Volcanic glass | 72.6% |
| Feldspar and quartz | 25.3% |
| Magnetite and others | 2.1% |

With 30g of coal tar pitch (softening point 95°C), 70g of the hollow glass spheres was blended at about 150°C. The mixture was placed in a molding machine and molded under a pressure of 15.5 kg/cm². The molded mixture was heated to 500°C at a rate of temperature increase of 3°C per minute, held at 500°C for 1 hour, and thereafter heated to 1000°C at a rate of temperature increase of 6°C per minute to effect desired roasting. The composite thus obtained was found to have a bulk density of 0.72 g/cm³ and a compressive strength of 133 kg/cm². The same procedure was followed, except that the mixing ratio of the pitch was varied. The composites consequently obtained were tested for bulk density and compressive strength. The results are shown in Table 7.

Table 7

| Amount of pitch (g) | Amount of hollow glass spheres (g) | Bulk density (g/cm³) | Compressive strength (kg/cm²) |
| --- | --- | --- | --- |
| 20 | 80 | 0.61 | 55.0 |
| 30 | 70 | 0.72 | 133.0 |
| 40 | 60 | 0.75 | 130.0 |

EXAMPLE 2

To 30g of coal tar pitch (softening point 95°C) and 25g of the hollow glass spheres of Example 1, there was added 45g of pulverized coke (60–100 mesh). They were blended at 150°C. The mixture was placed in a molding machine heated to 120°C and molded under a pressure of 15.5 kg/cm². The molded mixture was heated up to 1000°C by following the procedure of heating treatment shown in Example 1, to effect desired roasting. The composite thus obtained was found to have a bulk density of 1.01 g/cm². Other composites similarly obtained by using a fixed amount, 30g, of pitch with varying amounts of hollow glass spheres and coke were tested for bulk density and compressive strength. The results are shown in Table 8.

Table 8

| Amount of hollow glass spheres (g) | Amount of coke (g) | Bulk density (g/cm³) | Compressive strength (kg/cm²) |
| --- | --- | --- | --- |
| 25 | 45 | 1.01 | 246 |
| 40 | 30 | 0.82 | 180 |
| 60 | 10 | 0.65 | 119 |

When the roasting was made at 1300°C, the hollow glass spheres contained in the composite were not observed to melt under the heat.

EXAMPLE 3

A suspension was prepared by dissolving 10g of pyridine in 30g of naphtha-cracking pitch (softening point about 300°C). This suspension was blended with 70g of hollow glass spheres added thereto. The resulting mixture was placed in a molding machine maintained at 150°C and molded under a pressure of 15.5 kg/cm².

The molded mixture was roasted to 1000°C by following the procedure of Example 1. The composite consequently obtained was found to have a compressive strength of 30 kg/cm².

EXAMPLE 4

With 45g of pitch (softening point 150°C) produced from asphalt, 55g of hollow glass spheres (having an average particle size of 200 $\mu$) was blended at about 220°C. The resulting mixture was crushed. The crushed mixture was placed in a molding machine maintained at 200°C and molded under a pressure of 15.5 kg/cm². The molded mixture was heated to 600°C at a rate of temperature increase of 1°C per minute and then to 1000°C at a rate of temperature increase of 5°C per minute. The resulting composite was found to have a bulk density of 0.81 g/cm³ and a compressive strength of 238 kg/cm².

EXAMPLE 5

A mixture of 80g of phenol resin (Novolak) and 20g of hollow glass spheres (having an average particle size of 200 $\mu$) was poured into a molding machine and heated at 80°C for 24 hours to undergo thermosetting. The resulting set mixture was roasted by following the procedure of Example 1 to produce a composite. This composite was found to have a bulk density of 0.45 g/cm³, a compressive strength of 4 kg/cm² and high porosity.

EXAMPLE 6

A graphite-made mold 500mm in inside diameter and 200 mm in height was filled to 57 percent of the capacity with hollow glass spheres having a particle size of 297–590 $\mu$. Thereafter, a stainless steel gauze having a mesh size of 297 $\mu$ was set each at the inlet and the outlet of the mold, so that the hollow glass spheres would not flow out of the mold when the molten metal was poured in. The outlet of the mold was then connected to a vacuum evacuator. The mold was protected in advance against entry of molten metal and then immersed in molten aluminum at 760°C to be preheated. Then, the interior of the mold was evacuated to −700mmHg by means of said vacuum evacuator. The mold was opened to introduce the molten aluminum. The casting was completed in 5 seconds. The evacuation was discontinued immediately after the introduction of molten aluminum. Then, the mold was left to cool to normal room temperature. At the end of the cooling, the composite formed in the mold was removed.

The composite thus obtained and pure aluminum were compared in physical properties. The results are shown in Table 9 below.

Table 9

| Physical property | Composite of this invention | Pure aluminum |
| --- | --- | --- |
| Specific gravity | 1.19 | 2.71 |
| Tensile strength (kg/mm²) | 1.29 | 6.8 |
| Compressive strength (kg/mm²) | 3.00 | 9.4 |
| Specific compressive strength (kg/mm²) | 2.36 | 3.0 |
| Hardness (HB) | 4.46 | 16.1 |
| Heat conductivity (Cal/cm.°C.sec) | 0.080 | 0.510 |

EXAMPLE 7

Composites were produced by using the device of Example 6, with the voluminal ratio of hollow glass spheres to the capacity of the mold varied as indicated below. The composites thus obtained and a porous aluminum having a void ratio of 80 percent were compared in physical properties. The results are given in Table 10.

Table 10

| Volume percentage of hollow glass spheres to mold capacity / Physical property | 30 | 40 | 70 | 80 | Porous aluminum having a void ratio of 80% |
| --- | --- | --- | --- | --- | --- |
| Specific gravity | 1.96 | 1.39 | 1.09 | 0.92 | 0.54 |
| Tensile strength (kg/mm²) | 3.52 | 2.88 | 1.19 | 1.03 | 0.82 |
| Compressive strength (kg/mm²) | 4.97 | 3.20 | 2.91 | 2.64 | 1.15 |
| Specific compressive strength (kg/mm²) | 2.54 | 2.30 | 2.67 | 2.87 | 2.13 |
| Hardness (HB) | 7.55 | 5.46 | — | — | — |
| Heat conductivity (cal/cm.°C.sec) | 0.23 | 0.18 | 0.05 | 0.04 | — |

EXAMPLE 8

Composites were produced under the same conditions as in Example 6, using lead, zinc and tin in place of aluminum.

The physical properties of the composites were as shown in Table 11.

| Metal used / Physical property | Pb | Zn | Sn |
| --- | --- | --- | --- |
| Specific gravity | 5.1 | 3.4 | 3.2 |
| Tensile strength (kg/mm²) | 0.68 | 0.80 | 0.72 |
| Compressive strength (kg/mm²) | 2.31 | 2.45 | 2.29 |
| Specific compressive strength (kg/mm²) | 0.45 | 0.72 | 0.72 |

We claim:

1. A composite material essentially consisting of a metal and of hollow glass microspheres dispersed in said metal, said metal being free from voids, the melting point of said metal being lower than the melting point of the glass in said microspheres, said microspheres being produced by sintering pumice particles smaller than 250 microns at 800° to 1200°C.

2. A composite material according to claim 1, wherein the volume of the hollow glass microspheres is not less than 30 percent and not more than 80 percent of the apparent volume of the composite material.

3. A composite material according to claim 1, wherein the metal is at least one member selected from the group consisting of aluminum, zinc, lead and tin.

* * * * *